United States Patent
Lee et al.

(10) Patent No.: US 8,411,126 B2
(45) Date of Patent: Apr. 2, 2013

(54) METHODS AND SYSTEMS FOR CLOSE PROXIMITY SPATIAL AUDIO RENDERING

(75) Inventors: Bowon Lee, Mountain View, CA (US); Ton Kalker, Mountain View, CA (US); Kar Han Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 175 days.

(21) Appl. No.: 12/822,532

(22) Filed: Jun. 24, 2010

(65) Prior Publication Data

US 2011/0316966 A1 Dec. 29, 2011

(51) Int. Cl.
*H04N 7/14* (2006.01)
*H03B 29/00* (2006.01)

(52) U.S. Cl. .................... 348/14.01; 381/71.1

(58) Field of Classification Search .............. 348/14.16, 348/14.01, 14.08, 14.03, 14.04, 14.07; 381/116, 381/71.1
See application file for complete search history.

(56) References Cited

U.S. PATENT DOCUMENTS

| | | | |
|---|---|---|---|
| 6,643,375 B1 | 11/2003 | Philp et al. | |
| 7,555,141 B2 * | 6/2009 | Mori | 382/103 |
| 2006/0140420 A1 * | 6/2006 | Machida | 381/116 |
| 2009/0252356 A1 | 10/2009 | Goodwin et al. | |
| 2010/0328419 A1 * | 12/2010 | Etter | 348/14.08 |
| 2010/0328423 A1 * | 12/2010 | Etter | 348/14.16 |

OTHER PUBLICATIONS

Kyriakakis. "Fundamental and Technological Limitations of Immersive Audio Systems" 1998.*
Kyriakakis (Fundamental and Technological Limitations of Immersive Audio Systems; Proceedings of the IEEE, vol. 86, No. 5, May 1998).*

* cited by examiner

*Primary Examiner* — Duc Nguyen
*Assistant Examiner* — Theodore Ndje

(57) ABSTRACT

Disclosed herein are multimedia-conferencing systems and methods enabling local participants to hear remote participants from the direction the remote participants are rendered on a display. In one aspect, a method includes a computing device receives a remote participant's image and sound information collected at a remote site. The remote participant's image is rendered on a display at a local site. When the local participant is in close proximity to the display, sounds generated by the remote participant are played over stereo loudspeakers so that the local participant perceives the sounds as emanating from the remote participant's location rendered on the display.

18 Claims, 9 Drawing Sheets

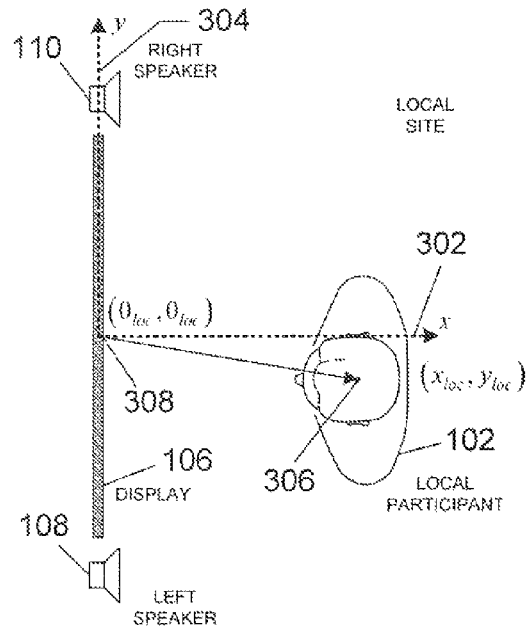
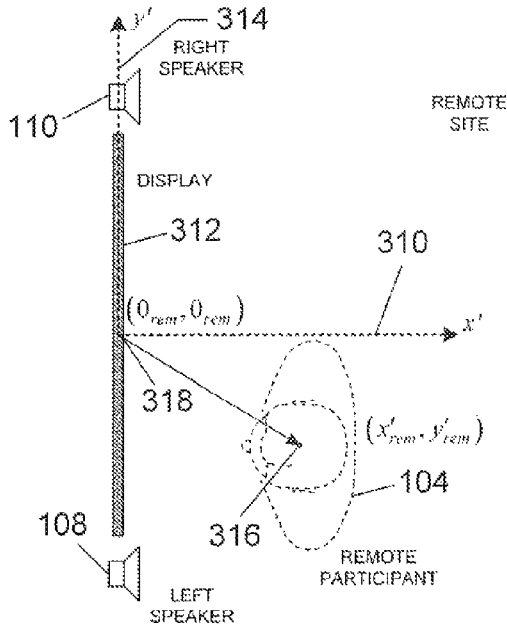
FIGURE 3A
FIGURE 3B
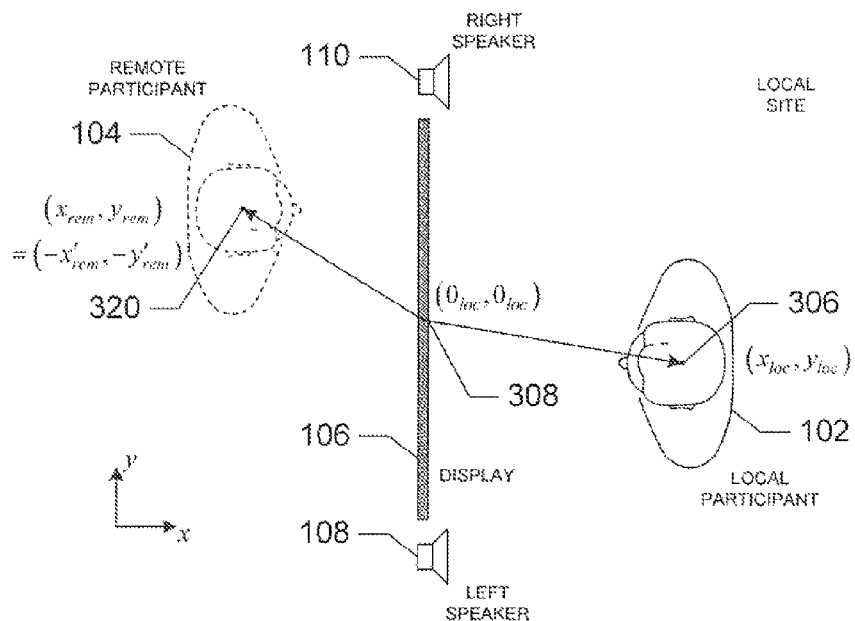
FIGURE 3C

_US 8,411,126 B2_

METHODS AND SYSTEMS FOR CLOSE PROXIMITY SPATIAL AUDIO RENDERING

TECHNICAL FIELD

The disclosure relates to audio processing, and in particular, to methods and systems for providing spatial cues in audio signals.

BACKGROUND

Some of the most productive interactions in the workplace occur when a small group of people get together at a blackboard or a whiteboard and actively participate in presenting and discussing ideas. However it is often difficult to support this style of interaction when participants are at different geographical locations, a situation that occurs more and more frequently as organizations become more geographically distributed. To date, conventional audio and video-conferencing systems are not well suited to this scenario. Effective collaboration relies on the ability of the parties to see each other and the shared collaboration surface, and to see where the others are looking and/or gesturing. Effective collaboration also relies on the ability to hear remotely located participants from the direction where they are rendered on the screen. Although conventional video-conferencing systems can use multi-user screen-sharing applications to provide a shared workspace, the audio typically does not correlate with the location of the participants presented on the display.

In recent years a number of audio processing techniques have been developed to provide a more realistic audio and video conferencing experience. For stereo spatial audio rendering, head-related transfer function ("HRTF") based methods can be used, but participants have to wear headphones. Loudspeaker based methods typically address the cancellation of cross talk, such as the left ear hearing from the right loudspeaker and vice versa, which is limited to cases where both the loudspeakers are located far away from the participants (i.e., loudspeaker-to-loudspeaker distance is much less than the loudspeaker-to-user distance), but the audio output from the loudspeakers does not correlate with the location of the participants displayed.

Users and manufactures of multimedia-conferencing systems continue to seek improvements in the audio aspects of the conferencing experience.

BRIEF DESCRIPTION OF THE DRAWINGS

FIGS. 3A-3C show examples of coordinate systems used to mathematically represent the coordinates of a remote participant and a local participant in accordance with one embodiment of the present invention.

DETAILED DESCRIPTION

Disclosed herein are multimedia-conferencing systems and methods enabling local participants to hear remote participants from the direction the remote participants are rendered on a display. In particular, when a local participant is positioned in close proximity to a display, the sounds generated by the remote participant are played through stereo loudspeakers located at the sides of the display such that the local participant perceives the sounds as if they are coming from the direction of the remote participant's image rendered on the display.

In the follow description the terms "locale participant" and "remote participant" are relative terms used to describe participants taking part in a video conference using the multimedia-conferencing systems described herein. A participant interacting with another participant located at another site via a display is referred to as a local participant, and the participant located at the other site and rendered on the local participant's display is referred to as a remote participant. For example, consider a first participant located at a first site and a second participant located at a second site. The first participant is referred to as a local participant and the second participant is referred to a remote participant when embodiments of the present invention are described from the site of the first participant.

Figure 1:
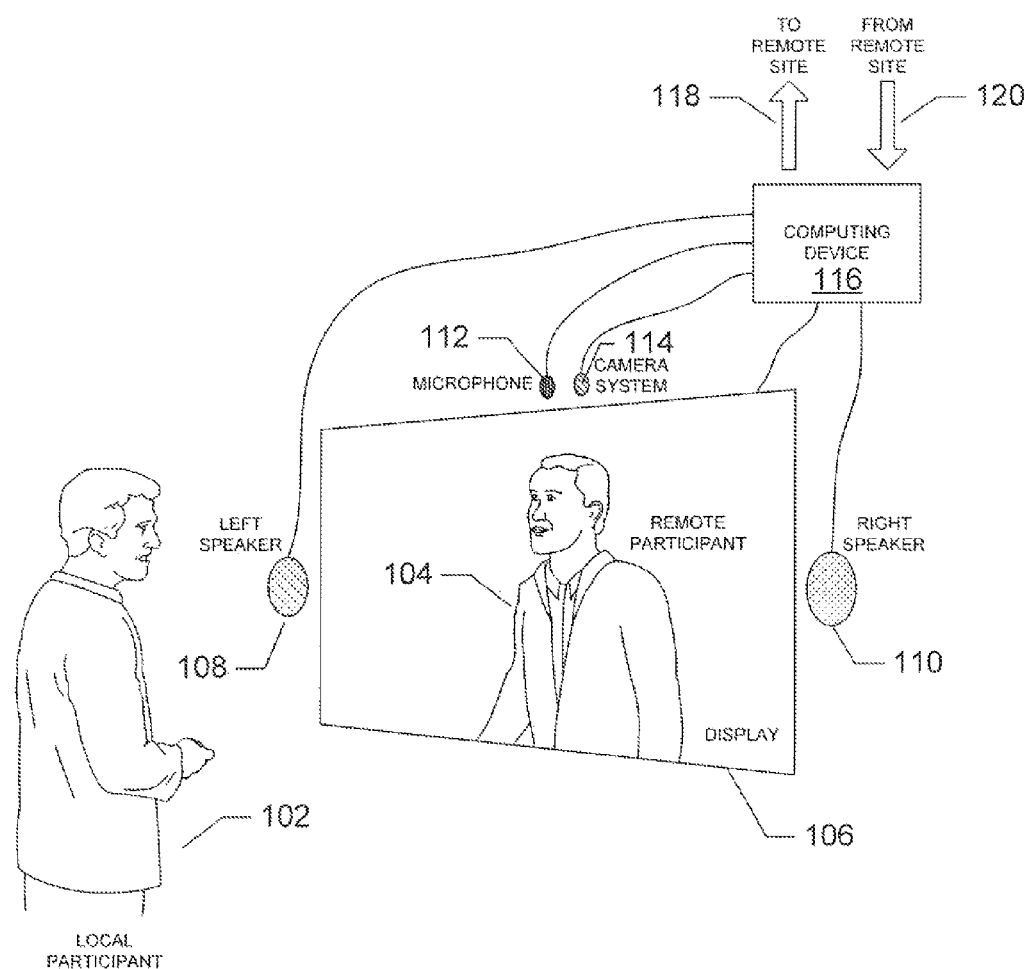
FIG. 1 shows an example of a multimedia-conferencing system that enables audio and visual interaction between a local participant and a remote participant in accordance with one embodiment of the present invention.

FIG. 1 shows an example of a multimedia-conferencing system 100 that enables audio and visual interaction between a local participant 102 and a remote participant 104. The system 100 is located at the local participant's site ("local site") and includes a display 106, a pair of left and right stereo loudspeakers 108 and 110, a microphone 112, a camera system 114, all of which are connected to a computing device 116. The display 106 can be a flat panel display, such as television set or a monitor, or the display 106 can be screen upon which images are projected for viewing by the local participant 102. The speakers 108 and 110 are located on opposite sides of the display 106 and can be used to generate stereo sounds as described below. In certain embodiments, the camera system 114 includes a camera for capturing images of objects or people located in front of the display 106 and a depth camera used to determine a local participant's location in front of the display 106. In alternative embodiments, the camera system 114 can be a stereo camera that can be used to capturing images of objects or people located in front of the display 106 and can be used to determine a local participant's location in front of the display 106. The microphone 112 captures a monaural or a single channel of audio generated at the local site. In alternative embodiments, two or more microphones can be used to capture sounds at the local site. The same or a nearly identical multimedia-conferencing system can be located at the remote participant's site ("remote site"). The computing device 116 receives audio and visual information captured at the local site by the microphone 112 and camera system 114 and sends the information to the remote site 118. The computing device 116 simultaneously receives audio and visual information captured at the remote site 120. The visual information captured at the remote site is processed and presented on the display 106. As shown in the example of FIG. 1, visual information captured at the remote site includes an image of the remote participant 104. The audio information captured at the remote site is also processed and played over the left and right stereo speakers 108 and 110.

Figure 2:
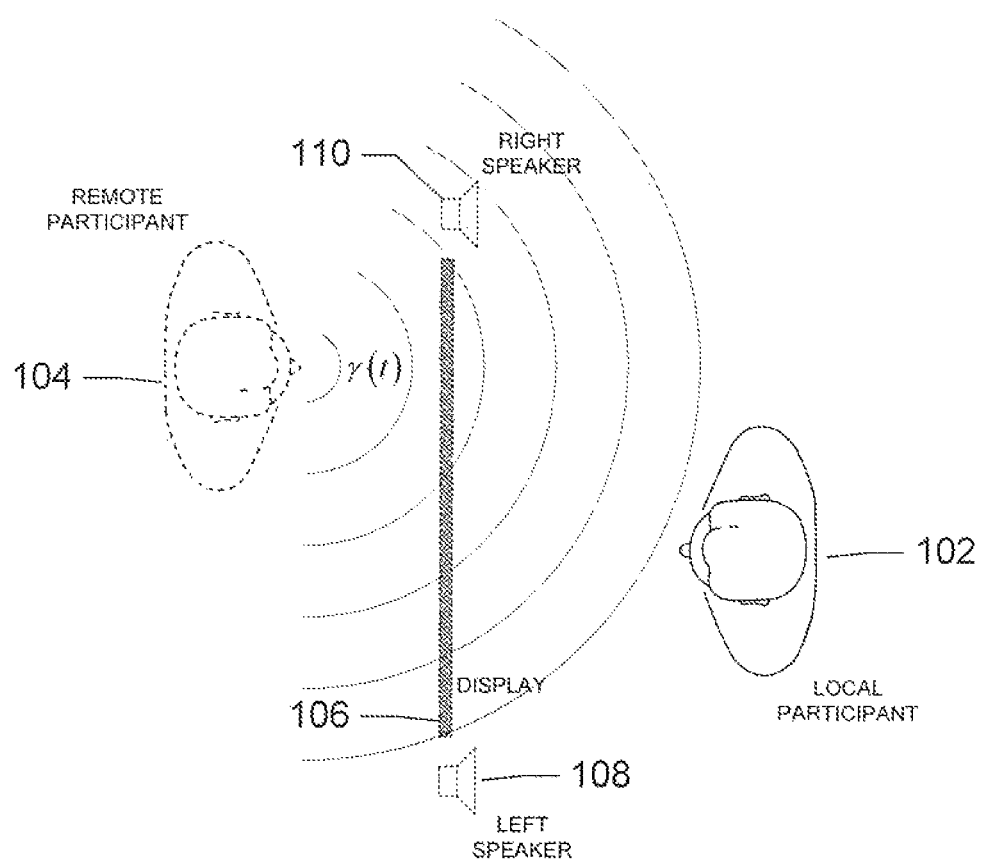
FIG. 2 shows an example top plan view of a local participant's perceived interaction with a remote participant in accordance with one embodiment of the present invention.

System and method embodiments are directed to processing and playing the sounds captured at the remote site so that the local participant 102 perceives the sounds generated by the remote participant 104 as if the sounds are emanating from the direction or position of the remote participant 104 rendered on the display 106. FIG. 2 shows an example top plan view of the local participant's 102 perceived interaction with the remote participant 104 as created by one system and method embodiment of the present invention. The visual information captured at the two sites and presented on the local and remote displays create a perceived window through which the participants can see one another as if the participants are located at the same site but are looking at each other through opposite sides of the same window. For example, as shown in FIG. 2, the visual information captured at the remote site indicates that the remote participant 104 is located to the left of the remote participant's camera and therefore appears on the right side of the local participant's display 106. The local participant 102 sees the image of the remote participant 104 as if the remote participant 104 was positioned on the other side of a window at the local site but to the right of the local participant's position. The sounds generated by the remote participant 104, $\gamma(t)$, are captured at the remote site, sent to the local site as audio signals, processed based on the relative positions of the local and remote participants, and played over the left and right stereo speakers 108 and 110 such that the local participant 102 perceives the sounds emanating from the direction of the remote participant's image rendered on the display 106.

Methods of processing and playing the sounds generated by the remote participant such that a local participant perceives the sounds as emanating from the location of the remote participant's image rendered on the display 106, also called "spatial audio rendering," are now described with reference to FIGS. 3-8. Spatial audio rendering is accomplished by computing interaural time difference ("ITD") and interaural intensity difference ("IID") in the time domain and using the ITD and IID information to adjust the sound output from the stereo speakers 108 and 110 as described below. During the video conference, at each site, depth information is periodically captured by the camera system and is used to determine the changing location of the participant within the site. Based on the depth information, the location of a participant can be translated into a mathematically represented point, or pair of numerical coordinates, in a two-dimensional coordinate system. For example, the coordinate system can be the Cartesian coordinate system with the xy-plane oriented parallel to the floor of the site and each site can use the center of the display as the origin of the coordinate system. In alternative embodiments, other coordinate systems can be used, including cylindrical and spherical coordinates, and other coordinate origins can be used, such as the location of the camera system. The coordinates of a participant are periodically determined based on the depth information captured by the camera system and sent along with the audio information to the other site.

FIG. 3A shows an example of a local coordinate system used to mathematically represent the local coordinates of the local participant. In the example of FIG. 3A, the local site coordinate system is a Cartesian coordinate plane oriented parallel to the local site floor and includes an x-axis 302 extending perpendicular from the approximate center of the display 106 and a y-axis 304 extending parallel to the display 106. The coordinates of the local participant 102 in the local coordinate system are denoted by $(x_{loc}, y_{loc})$ 306 with the origin 308 of the local coordinate system located at the approximate center of the display 106.

FIG. 3B shows an example of a remote coordinate system used to mathematically represent the remote coordinates of the remote participant. In the example of FIG. 3B, the remote coordinate system is also a Cartesian coordinate plane oriented parallel to the remote site floor and includes an x'-axis 310 extending perpendicular from the approximate center of the display 312 and a y'-axis 314 extending parallel to the display 312. The remote site coordinates of the remote participant 104 in the remote coordinate system are denoted by $(x'_{rem}, y'_{rem})$ 316 with the origin 318 of the remote coordinate system located at the approximate center of the display 312.

The coordinates of the remote participant 104 are periodically determined and sent along with the captured audio information to the local site. At the local site, the remote site coordinates $(x'_{rem}, y'_{rem})$ 316 are received and adjusted to match to the image of the remote participant 104 rendered on the display 106 in the local coordinate system. Because both the local and remote sites use, the centers of the displays 1.06 and 312 as the corresponding coordinate system origins, the virtual coordinates of the remote participant 104 presented on the display 106 can be determined by rotating the remote participant's coordinates $(x'_{rem}, y'_{rem})$ 316 by n radians (i.e., 180°), which gives the perceived local virtual coordinates of the remote participant 104 in the local coordinate system as $(x_{rem}, y_{rem}) = (-x'_{rem}, -y'_{rem})$ 320. In other words, the local site virtual coordinates $(x_{rem}, y_{rem})$ 320 mathematically represent a perceived or virtual location of the remote participant 104 presented on the display 106 in the local coordinate system.

Embodiments of the present invention are not limited to rotating the remote participant's coordinates to obtain local virtual coordinates. The virtual coordinates of the remote participant in the local coordinate system can be adjusted to match different renderings of the remote participant 106. For example, in alternative embodiments, the remote participant's image displayed on the display 106 can be mirrored, such as in a Connect Board. When the remote participant's image is mirrored, the remote participant's virtual coordinates in the local coordinate system are given by $(x_{rem}, y_{rem}) = (-x'_{rem}, y'_{rem})$.

Figure 4:
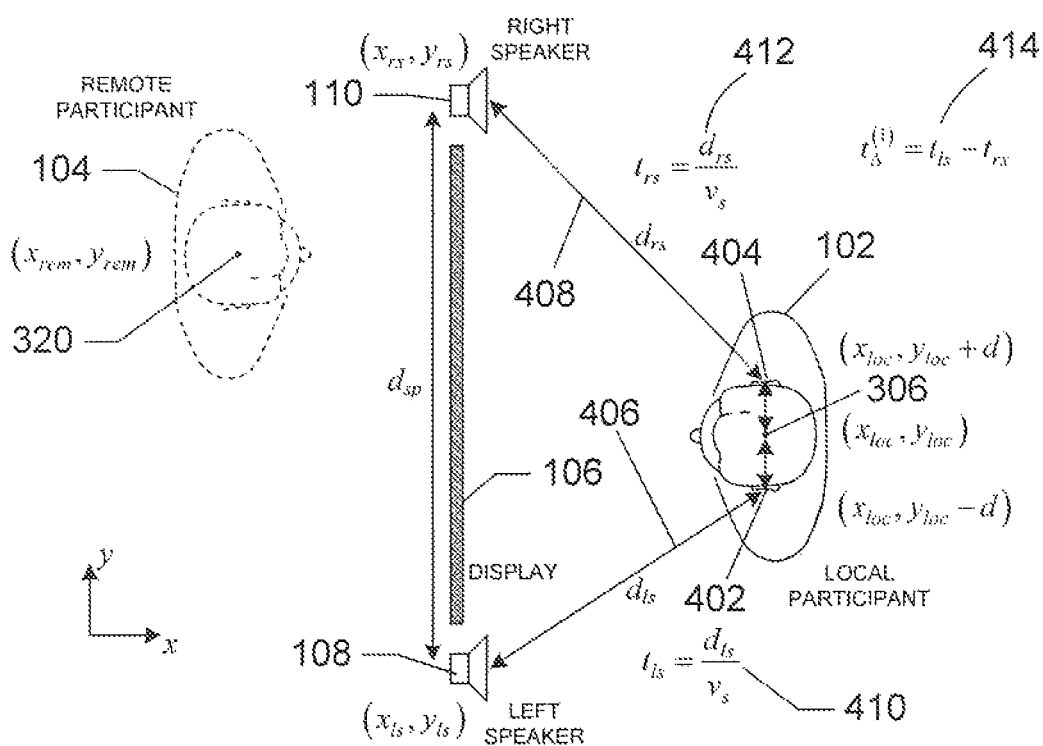
FIG. 4 shows an example of determining an interaural time difference between right and left speakers and corresponding right and left ears of a local participant in accordance with one embodiment of the present invention.

Once the coordinates of the local and remote participants are obtained in the local coordinate system, the approximate distance from the local participant's right ear to the right speaker 110, $d_{rs}$, is determined and the approximate distance from the local participant's left ear to the left speaker 108, $d_{ls}$, is determined, as shown in FIG. 4. When the distances $d_{rs}$ and $d_{ls}$ are both less than the distance between the left and right speakers 108 and 110, $d_{sp}$, the times at which the sounds are output from the left and right speakers are adjusted so that the local participant 102 perceives the sounds as emanating from the direction of the remote participant 104 rendered on the display 106. Otherwise, when either or both distances $d_{rs}$ and $d_{ls}$ are greater than the distance $d_{sp}$, the sounds output from the left and right speakers 108 and 110 are not adjusted and can be played at the same time. The times at which sounds are output from the speakers 108 and 110 are based on the ITD between the arrival of a sound emanating from the remote participant's virtual coordinates and the two ears of the local participant 102 and is based on the ITD between the arrival of sounds emanating from the speakers 108 and 110 and the two ears of the local participant 102.

FIG. 4 shows an example of determining the ITD between right and left speakers 108 and 110 and the right and left ears, respectively, of the local participant 102. As shown in FIG. 4, the approximate coordinates of the local participant's left ear 402 are $(x_{loc}, y_{loc}-d)$, and the approximate coordinates of the local participant's right ear 404 are $(x_{loc}, y_{loc}+d)$, where d is a value that represents half the average distance between human ears, and the average distance between human ears can range from approximately 9 cm to approximately 15 cm. Based on the coordinates of the left speaker 108 $(x_{ls}, y_{ls})$ and the right speaker $(x_{rs}, y_{rs})$ 110 and the coordinates of the left and right ears 402 and 404, the approximate distance $d_{ls}$ 406 from the left ear 402 to the left speaker 108 and the approximate distance $d_{rs}$ 408 from the right ear 404 to the right speaker 110 are determined. The time it takes for a sound produced by the left speaker 108 to reach the left ear 402 is denoted by $t_{ls}$ and can be determined by rate equation 410, where $v_s$ is the velocity of sound, and the time it takes for a sound produced by the right speaker 110 to reach the right ear 404 is denoted by $t_{rs}$ and can be determined by rate equation 412. The ITD between the time $t_{ls}$ at which a sound arrives at the left ear 402 from the left speaker 108 and the time $t_{rs}$ at which a sound arrives at the right ear 404 from the right speaker 110 is denoted by $t_\Delta^{(1)}$ 414 and is equal to the difference in times $t_{rs}$ and $t_{ls}$.

Figure 5:
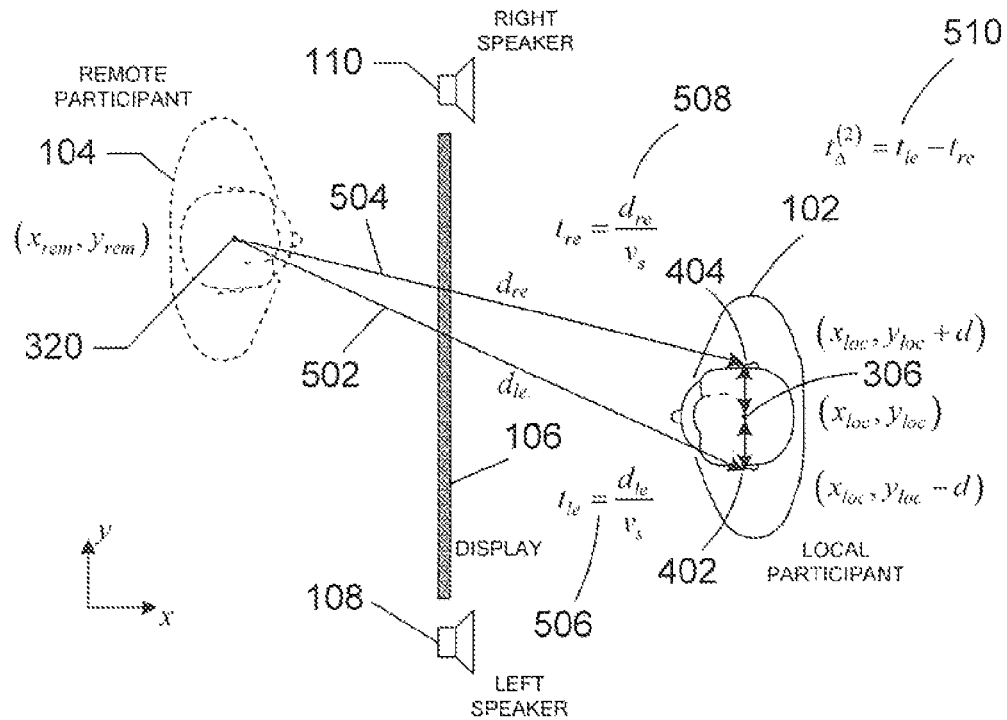
FIG. 5 shows an example of determining an interaural time difference between a remote participant's virtual coordinates and right ear and left ear of a local participant in accordance with one embodiment of the present invention.

FIG. 5 shows an example of determining the ITD between the remote participant's virtual coordinates 320 and the right ear 402 and the left ear 404 of the local participant 102. As shown in FIG. 5, based on the local virtual coordinates of the remote participant 104 $(x_{rem}, y_{rem})$ 320 and the coordinates of the local participant's right and left ears $(x_{loc}, y_{loc}+d)$ 402 and $(x_{loc}, y_{loc}-d)$ 404, approximate distances from the remote participant 104 to the right ear 402 and left ear 404 of the local participant 102 are given by $d_{le}$ 502 and $d_{re}$ 504, respectively. The time it takes for a sound produced by the remote participant 104 at the local virtual coordinates $(x_{rem}, y_{rem})$ 320 to reach the left ear 402, $t_{le}$, can be determined by rate equation 506, and the time it takes for a sound produced by the remote participant 104 to reach the right ear 404, $t_{re}$, can be determined by rate equation 508. The ITD between the time $t_{le}$ at which a sound arrives at the left ear 402 from the local virtual coordinates $(x_{rem}, y_{rem})$ 320 and the time $t_{re}$ at which a sound arrives at the right ear 404 from the local virtual coordinates $(x_{rem}, y_{rem})$ 320 is denoted by $t_\Delta^{(2)}$ 510 and is equal to the difference in times $t_{re}$ and $t_{le}$.

Based on the ITDs $t_\Delta^{(1)}$ and $t_\Delta^{(2)}$, the times at which the sounds are output from the left and right speakers 108 and 110 are adjusted so that the local participant 102 perceives the sound as emanating from the direction of the remote participant 104 rendered on the display 106. Assuming the distances $d_{rs}$ and $d_{ls}$ are both less than the distance $d_{sp}$ (i.e., the local participant 102 is in close proximity to the display 106), the output from the speaker located farthest from the local virtual coordinates $(x_{rem}, y_{rem})$ 320 is time delayed by an amount $$\Delta = t_\Delta^{(2)} - t_\Delta^{(1)}$$

In addition to adjusting the times at which the sounds are output from the left and right speakers 108 and 110, methods of the present invention also include playing the sounds at speakers 108 and 110 with different sound intensities based on the IID. The IID arises from the head of the local participant shadowing of the sound wave. A sound coming from the remote participant's virtual coordinates has a higher intensity, or is louder, at the local participant's ear located nearest to the remote participant's coordinates. In order to determine the IID and adjust the volume of the speakers 108 and 110 appropriately, the sound intensities at the local participant's left and right ears are approximated with respect to the remote participant's virtual coordinates and approximated with respect to the location of the speakers.

Figure 6A:
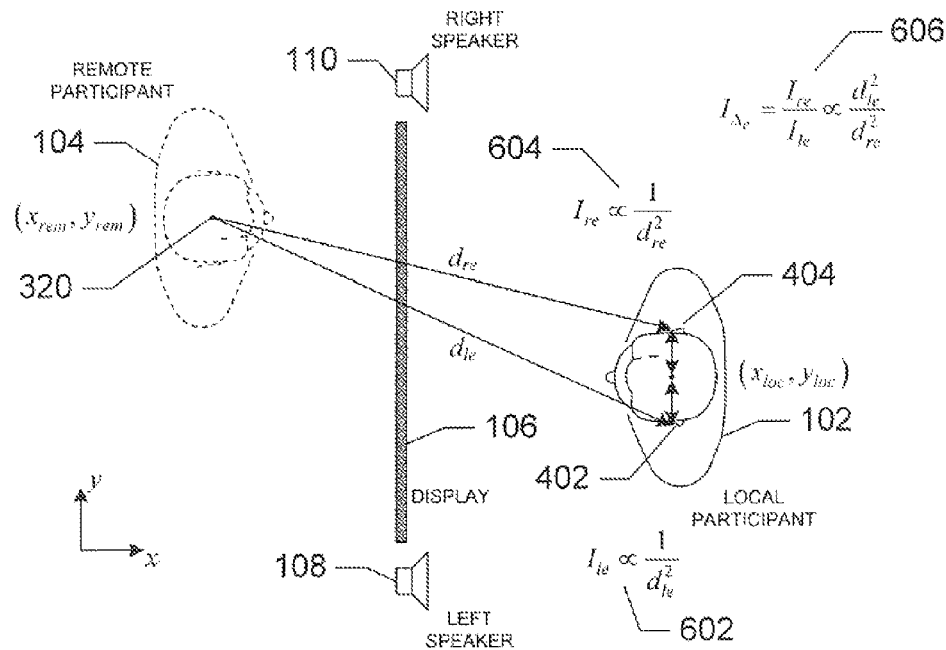
FIGS. 6A-6B show an example of determining an interaural intensity difference between a remote participant's virtual coordinates and the right ear and the left ear of a local participant in accordance with one embodiment of the present invention.
Figure 6B:
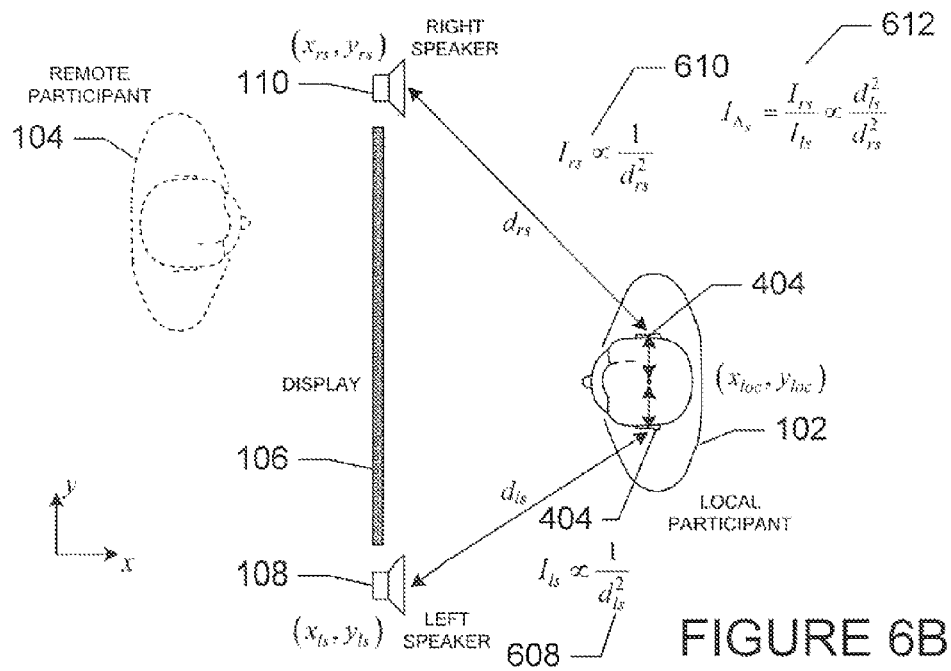

FIG. 6A shows an example of determining the IID between the local virtual coordinates $(x_{rem}, y_{rem})$ 320 of the remote participant 106 and the right ear 402 and the left ear 404 coordinates of the local participant 102. The sound intensity at the local participant's left ear 402, $I_{le}$, is propoitional to the inverse square of the distance $d_{le}$ 602, and the sound intensity at the local participant's right ear 404, $I_{re}$, is proportional to the inverse square of the distance $d_{re}$ 604. The IID between the intensity $I_{le}$ and the intensity $I_{re}$ is denoted by $I_{\Delta_e}$ 606 and is equal to the ratio of the intensities $I_{re}$ and $I_{le}$. FIG. 6B shows an example of determining the IID between the left and right speakers 108 and 110 and the right ear 402 and left ear 404 coordinates of the local participant 102. The sound intensity at the local participant's left ear 402, $I_{ls}$, is proportional to the inverse square of the distance $d_{ls}$ 608, and the sound intensity at the local participant's right ear 404, $I_{rs}$, is proportional to the inverse square of the distance $d_s$ 610. The IID between the intensity $I_{rs}$, and the intensity $I_{rs}$ is denoted by $I_{\Delta_s}$ 616 and is equal to the ratio of the intensities $I_{rs}$ and $I_{ls}$.

Based on the IIDs $I_{\Delta_e}$ and $I_{\Delta_s}$, the sound intensities at which the sounds are output from the left and right speakers 108 and 110 are adjusted so that the local participant 102 perceives the sound as emanating from the direction of the remote participant 104 rendered on the display 106. Assuming the distances $d_{rs}$ and $d_{ls}$ are both less than the distance $d_{sp}$ (i.e., the local participant 102 is in close proximity to the display 106), the output from the speaker located closest to the local virtual coordinates $(x_{rem}, y_{rem})$ 320 receives an intensity adjustment of $$\sqrt{I_\Delta} = \sqrt{\frac{I_{\Delta_e}}{I_{\Delta_s}}}$$

Figure 7:
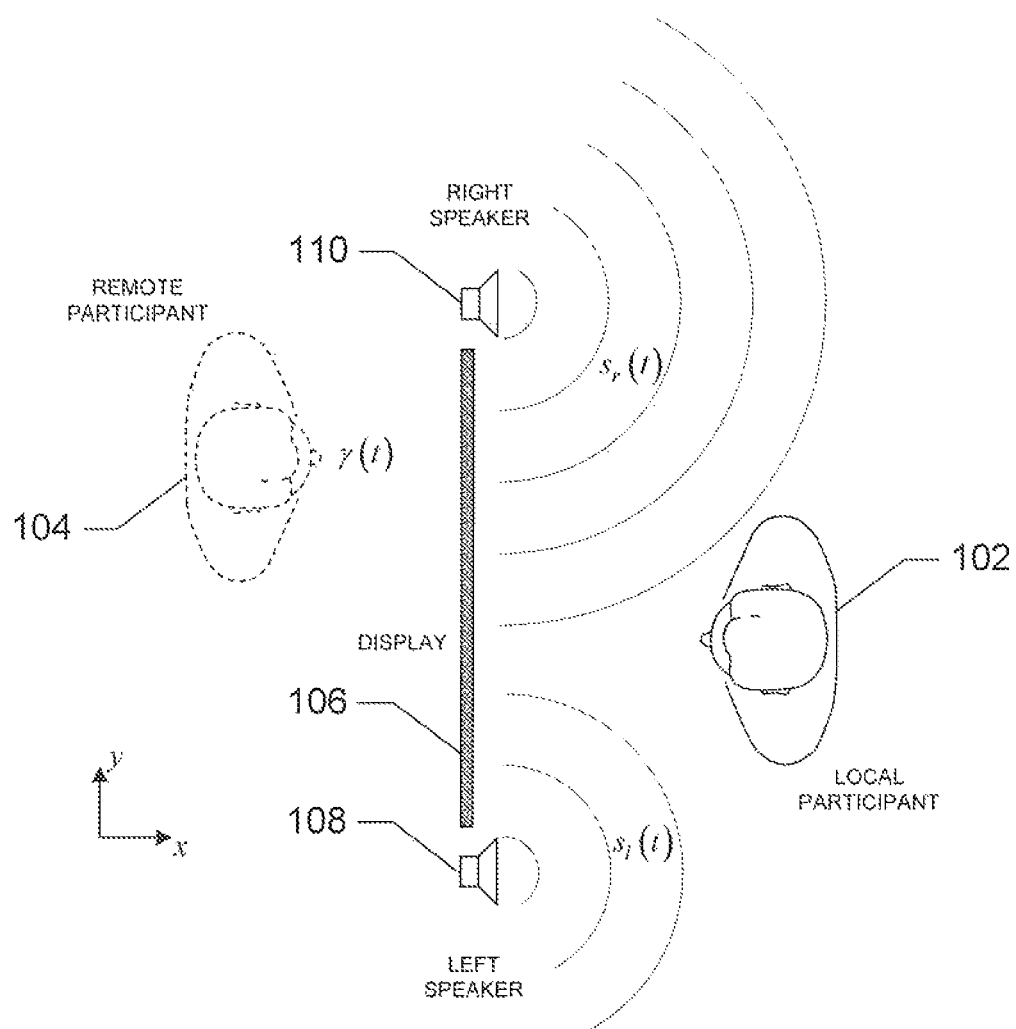
FIG. 7 shows an example of adjusting intensity and time delay in the speakers at a local participant's site in accordance with one embodiment of the present invention.

FIG. 7 shows an example of adjusting intensity and time delay in the speakers 108 and 110. The sound $s_r(t)$ 702 output from right speaker 110 is the sound generated by the remote participant 104 $\gamma(t)$ adjusted by an intensity $\sqrt{I_{66}}$ and is played without a time delay. On the other hand, the sound $s_l(t)$ 704 output from the left speaker 108 is also the sound generated by the remote participant 104 but the sound is played with a time delay $\gamma(t-\Delta)$ and the intensity is not adjusted. The intensity variation and time difference at which the sounds are played through the left speaker 108 and the right speaker 110 create the effect or perception for the local participant 102 that the sounds generated by the remote participant 104 emanate from the remote participant's general location rendered on the display 106.

Figure 8:
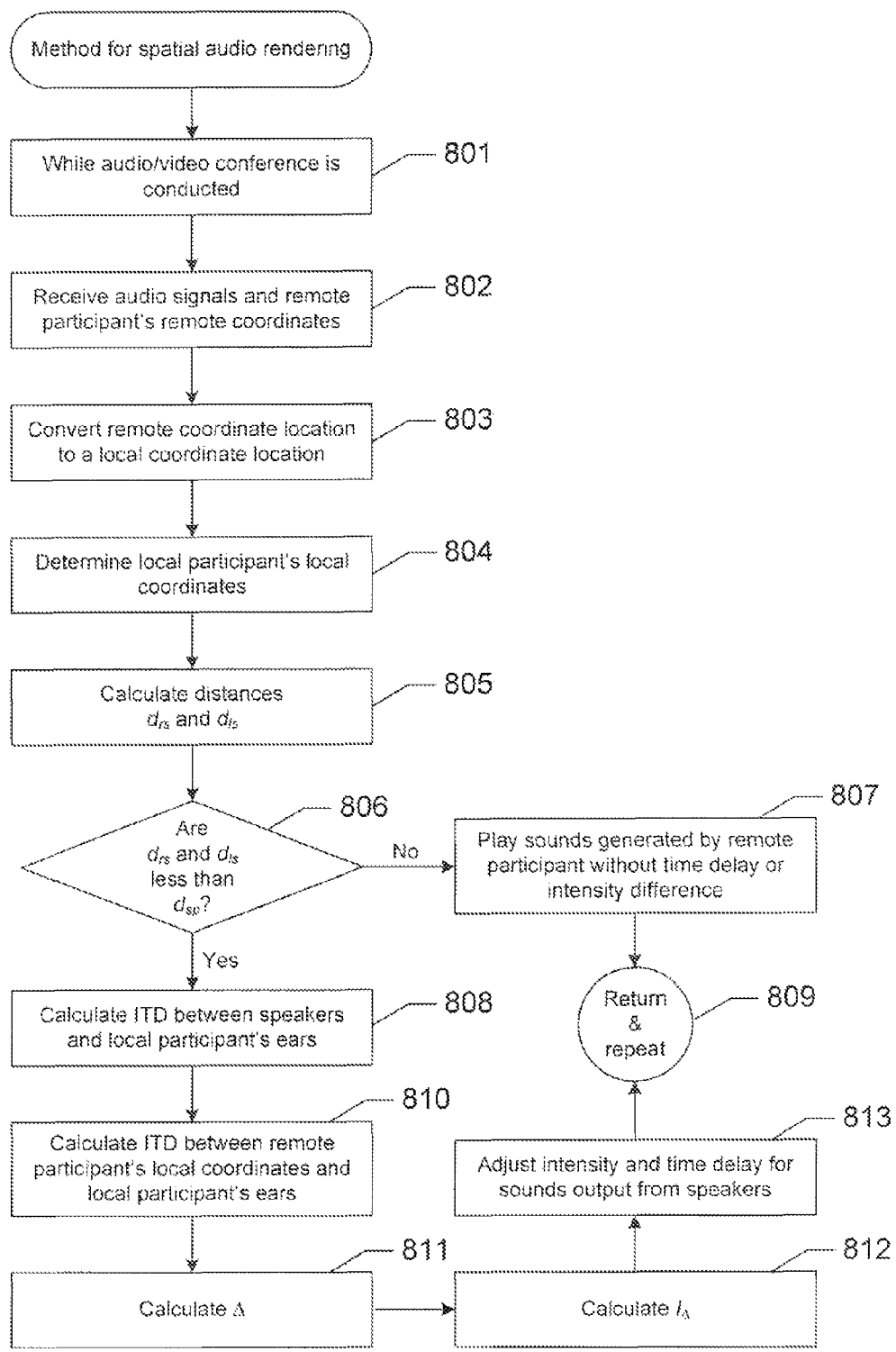
FIG. 8 shows a control-flow diagram that summarizes methods of spatial audio rendering in accordance with one embodiment of the present invention.

FIG. 8 shows a control-flow diagram that summarizes methods of spatial audio rendering described above with reference to FIGS. 3-7. Note that method embodiments are not restricted to the order of the steps represented in FIG. 8. In alternate embodiments, a number of different steps can be interchanged. In step 801, a while loop is initiated where steps 802-813 are repeated while an audio/video conference is conducted between a local participant and a remote participant using the multimedia-conferencing system described above with reference to FIG. 1. In step 802, audio signals and a remote participant's remote site coordinates are received at the local site, as described above with reference to FIGS. 1 and 3B. The remote site coordinates of the remote participant can be obtained using depth information provided by a depth camera or a three dimensional images captured be a stereo camera system. In step 803, the remote site coordinates are converted to local site virtual coordinates, as described above with reference to FIG. 3C. In step 804, local site coordinates for the local participant are obtained using information provided by a depth camera or a three dimensional images captured be a stereo camera system. In step 805, the distances $d_{rs}$ and $d_{ls}$ of the local participant's right and left ears from the right and left stereo speakers, respectively, are calculated, as described above with reference to FIG. 4. In step 806, when at least one of the distances $d_{rs}$ and $d_{ls}$ is greater than the distance between the left and right speakers $d_{sp}$, the method proceeds to step 807, otherwise the method proceeds to step 808 and the local participant is said to be in "close proximity" to the display. In step 807, the sounds generated by the remote participant are played through left and right speakers without time delay or intensity differences. In step 809, the returns to repeat steps 802-806. In step 808, the ITD between the right speaker and the right ear of the local participant is calculated and the ITD between the left speaker and the left ear of the local participant is calculated, as described above with reference to FIG. 4. In step 810, the ITD between the remote participant's local coordinates and the right and left ears of the local participant is calculated, as described above with reference to FIG. 5. In step 811, the time delay Δ is calculated, as described above with reference to FIG. 5. In step 812, IID is calculated as described above with reference to FIGS. 6A-6B. In step 813, the intensity and a time delay for the sounds output from left and right speakers is adjusted in order to create the perception for the local participant that the sounds produced by the remote participant are emanating from the remote participants position rendered on a display at the local site, as described above with reference to FIG. 7. The method then proceeds to step 809 where steps 802-806 are repeated while video/audio conference is conducted.

Figure 9:
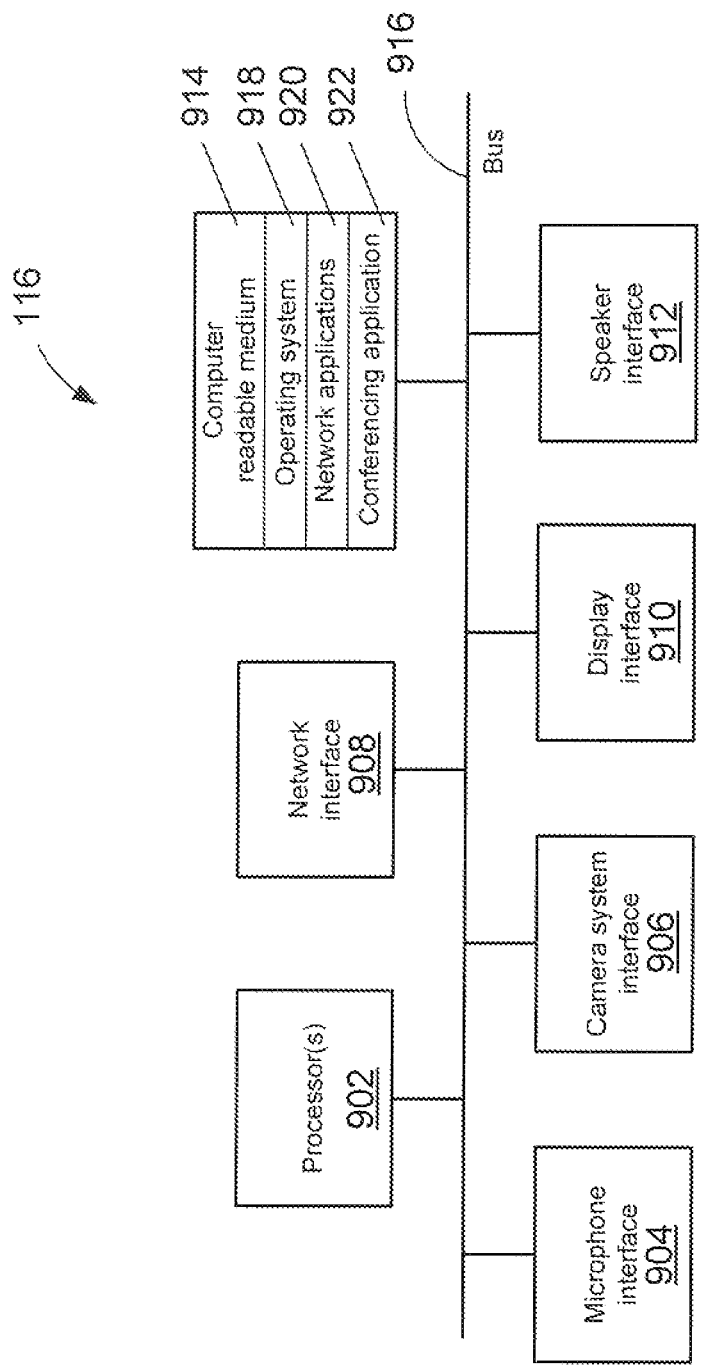
FIG. 9 shows a schematic representation of a computing device used in multimedia conferencing in accordance with one embodiment of the present invention

In general, the methods employed to establish visual and audio collaboration between local and remote participants can be implemented on a computing device, such as a desktop computer, a laptop, or any other suitable computational device. FIG. 9 shows a schematic representation of the computing device 116 shown in FIG. 1. The device 116 includes one or more processors 902, such as a central processing unit; a microphone interface 904; a camera system interface 906; a network interface 908, such as a Local Area Network LAN, a wireless 802.11x LAN, a 3G mobile WAN or a WiMax WAN; a display interface 910; stereo speaker interface 912; and one or more computer-readable mediums 914. Each of these components is operatively coupled to one or more buses 916. For example, the bus 916 can be an EISA, a PCI, a USB, a FireWire, a NuBus, or a PDS.

The computer readable medium 914 can be any suitable medium that participates in providing instructions to the processor(s) 902 for execution. For example, the computer readable medium 914 can be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 914 can also store other software applications, including word processors, browsers, email, Instant Messaging, media players, and telephony software.

The computer-readable medium 914 may also store an operating system 918, such as Mac OS®, Microsoft Windows®, Unix®, or Linux®; network applications 920; and a multimedia-conferencing application 922. The operating system 918 can be multi-user, multiprocessing, multitasking, multithreading, real-time and the like. The operating system 918 can also perform basic tasks such as recognizing input from input devices, such as a keyboard or a keypad; sending output to the display and speaker interfaces 910 and 912; keeping track of files and directories on the medium 914; controlling peripheral devices, such as disk drives, printers, camera systems; and managing traffic on the one or more buses 916. The network applications 920 include various components for establishing and maintaining, network connections, such as software for implementing communication protocols including TCP/IP, HTTP, Ethernet, USB, and FireWire.

The multimedia-conferencing application 922 provides various software components for establishing visual and audio collaboration with one or more remote participants as described above and summarized in FIG. 8. In certain embodiments, some or all of the processes performed by the application 922 can be integrated into the operating system 918. In certain embodiments, the processes can be at least partially implemented in digital electronic circuitry, or in computer hardware, firmware, software, or in any combination thereof.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. In a video/audio conference between a local participant and a remote participant, a method of spatial audio rendering the remote participant at a local site using a computing device comprising:
    receiving the remote participant's image and sound information collected at a remote site;
    receiving location information collected at the remote site that indicates the remote participant's location in front of a remote display at the remote site;
    rendering the remote participant's image on a local display at the local site;
    determining the local participant's location in front of the local display by determining the distance between first and second speakers of the stereo loudspeakers is greater than the distance between the local participant's left ear and the left speaker and is greater than the distance between the local participant's right ear and the right speaker; and
    when the local participant is in close proximity to the local display, playing sounds generated by the remote participant over stereo loudspeakers by adjusting the sounds based at least in part on the remote participant's location in front of the remote display at the remote site and the local participant's location in front of the local display so that the local participant perceives the sounds as emanating from the remote participant's location rendered on the local display.

2. The method of claim 1, wherein playing sounds generated by the remote participant over the stereo loudspeakers further comprises adjusting intensity of each loudspeaker such that the sound intensity output from the speaker located closest to the remote participant's location rendered on the local display is greater than the sound intensity output from the speaker located farthest from the remote participant's location rendered on the local display.

3. The method of claim 2, wherein adjusting the intensity of each loudspeaker further comprises determining an interaural intensity difference between the intensity of sounds reaching the local participant's left ear from the location of the remote participant's image rendered on the local display and the intensity of sounds reaching the local participant's right ear from the location of the remote participant's image rendered on the local display.

4. The method of claim 1, wherein playing sounds generated by the remote participant over the stereo loudspeakers further comprises playing sounds through a first loudspeaker before or after playing the same sounds through a second loudspeaker.

5. The method of claim 4, wherein playing sounds generated by the remote participant over the stereo loudspeakers further comprises applying a time delay to the sound output from the loudspeaker located farthest from the remote participant's location rendered on the local display.

6. The method of claim 5, wherein applying the time delay further comprises
  determining a first interaural time difference between the time for sound to travel from the first speaker to the local participant's left ear and the time for sound to travel from the second speaker to the local participant's right ear;
  determining a second interaural time difference between the time for sound to travel from local virtual coordinates of the remote participant to the local participant's left ear and the time for sound to travel from the local virtual coordinates of the remote participant to the local participant's right ear; and
  computing the time delay as the difference between the first interaural time difference and the second interaural time difference.

7. The method of claim 1, wherein the loudspeakers are located on opposite sides of the local display.

8. The method of claim 1, further comprising when the local participant is not in close proximity to the local display, playing sounds generated by the remote participant over stereo loudspeakers without an intensity difference or a time delay.

9. A non-transitory computer-readable medium having instructions encoded thereon for enabling a processor to perform the operations of:
  receive a remote participant's image and sound information collected at a remote site;
  receive location information collected at the remote site that indicates the remote participant's location in front of a remote display at the remote site;
  render the remote participant's image on a local display at the local site;
  determine the local participant's location in front of the local display by determining that the distance of the local participant's left and right ear from a left and right speaker of the stereo loudspeakers respectively is less than the distance between the first and second speakers of the stereo loudspeakers; and
  when a local participant is in close proximity to the local display, play sounds generated by the remote participant over stereo loudspeakers by adjusting the sounds based at least in part on the remote participant's location in front of the remote display at the remote site and the local participant's location in front of the local display so that the local participant perceives the sounds as emanating from the remote participant's location rendered on the local display.

10. A multimedia-conferencing system comprising:
  a local display;
  stereo loudspeakers;
  a camera system; and
  a computing device including at least one processor and memory having instructions encoded thereon for enabling the least one processor to perform the operations of:
    receive a remote participant's image and sound information collected at a remote site,
    receive location information collected at the remote site that indicates the remote participant's location in front of a remote display at the remote site,
    render the remote participant's image on the local display at the local site,
    determine a local participant's location in front of the local display based on depth information capture by the camera system;
    when the local participant is located in close proximity to the local display, play sounds generated by the remote participant over the stereo loudspeakers by adjusting the sounds based at least in part on the remote participant's location in front of the remote display at the remote site and the local participant's location in front of the local display so that the local participant perceives the sounds as emanating from the remote participant's location rendered on the local display; and
    when the local participant is not in close proximity to the local display, playing sounds generated by the remote participant over stereo loudspeakers without an intensity difference or a time delay.

11. The system of claim 10, wherein the local display further comprises one of a television, a monitor, or projector and a screen for displaying images generated by the projector.

12. The system of claim 10, wherein stereo loudspeakers further comprise a first speaker and a second speaker located on opposite sides of the local display.

13. The system of claim 10, wherein the camera system further comprises:
  a camera that captures images of the local participant; and
  a depth camera that captures depth information of the local participant.

14. The system of claim 10, wherein the camera system further comprises a stereo camera that captures three dimensional images of the local participant.

15. The system of claim 10 further comprising one or more microphones for capturing sounds generated by the local participant.

16. The system of claim 10, wherein sounds generated by the remote participant are played over the stereo loudspeakers further comprises adjust intensity of each loudspeaker such that the sound intensity output from the speaker located closest to the remote participant's location rendered on the local display is greater than the sound intensity output from the speaker located farthest from the remote participant's location rendered on the local display.

17. The system of claim 10, wherein sounds generated by the remote participant are played over the stereo loudspeakers further comprises play sounds through a first loudspeaker before or after playing the same sounds through a second loudspeaker.

18. The system of claim 17, wherein play sounds generated by the remote participant over the stereo loudspeakers further comprises apply a time delay to the sound output from the loudspeaker located farthest from the remote participant's location rendered on the local display.

\* \* \* \* \*

UNITED STATES PATENT AND TRADEMARK OFFICE
CERTIFICATE OF CORRECTION

PATENT NO. : 8,411,126 B2
APPLICATION NO. : 12/822532
DATED : April 2, 2013
INVENTOR(S) : Bowon Lee et al.

It is certified that error appears in the above-identified patent and that said Letters Patent is hereby corrected as shown below:

In the Claims

In column 10, line 19, in Claim 10, before "least" insert -- at --.

Signed and Sealed this
Twenty-seventh Day of August, 2013

Teresa Stanek Rea
*Acting Director of the United States Patent and Trademark Office*